(12) United States Patent
Shinohara et al.

(10) Patent No.: US 7,159,982 B2
(45) Date of Patent: Jan. 9, 2007

(54) METHOD FOR PROVIDING DESIGN DATA AND SYSTEM FOR PROVIDING DESIGN DATA

(75) Inventors: Toshihide Shinohara, Nagano (JP); Kazutoshi Kato, Nagano (JP); Tadashi Kaga, Nagano (JP); Satoshi Kubota, Nagano (JP); Masaaki Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 199 days.

(21) Appl. No.: 10/905,738

(22) Filed: Jan. 19, 2005

(65) Prior Publication Data

US 2005/0157254 A1   Jul. 21, 2005

(30) Foreign Application Priority Data

Jan. 19, 2004   (JP)   ............................ 2004-010518

(51) Int. Cl.
  *G02C 7/06*   (2006.01)
  *G06F 19/00*  (2006.01)
  *G06Q 30/00*  (2006.01)

(52) U.S. Cl. ........................ 351/177; 351/169; 700/97; 705/26

(58) Field of Classification Search ................ 351/169, 351/177; 700/97; 705/26
See application file for complete search history.

(56) References Cited

U.S. PATENT DOCUMENTS

2004/0215525 A1 * 10/2004 Keane et al. .................. 705/26
2005/0004694 A1 *  1/2005 Ueno .......................... 700/97

FOREIGN PATENT DOCUMENTS

| JP | 2002-323681 A | 11/2002 |
| JP | 2004-4436 A   | 1/2004  |
| JP | 2004-109813 A | 4/2004  |

* cited by examiner

Primary Examiner—Scott J. Sugarman
(74) Attorney, Agent, or Firm—Sughrue Mion, PLLC (57) ABSTRACT

A method for providing design data and a system for providing design data that enable a lens processor to manufacture a desired inner-surface progressive addition lens corresponding to prescription data. A design data providing system is a system such that a design data creator provides design data of an inner-surface progressive addition lens to a lens processor in the case where the lens processor has agreed upon a contract to the effect that the lens processor receives provision of the design data of the inner-surface progressive addition lens from the design data creator on the condition that the lens processor pays a consideration. The design data providing system has a server device as a host computer device, a terminal computer device, and a network for connecting the server device to the terminal computer device.

20 Claims, 6 Drawing Sheets

METHOD FOR PROVIDING DESIGN DATA AND SYSTEM FOR PROVIDING DESIGN DATA

This application claims priority from Japanese Patent Application No. JP 2004-010518 filed on Jan. 19, 2004 in the Japanese Patent Office, the disclosure of which is incorporated herein by reference.

BACKGROUND OF THE INVENTION

1. Field of the Invention

This invention relates to a method for providing design data and a system for providing design data. This invention can be used, for example, for providing design data of an inner-surface progressive addition lens.

2. Description of the Related Art

Recently, spectacles using inner-surface progressive addition lenses, which are spectacles for both farsightedness and nearsightedness, are used in the case where the amplitude of accommodation of the eyes is lowered by presbyopia or the like. This inner-surface progressive addition lens is a single lens having different powers. For example, its upper portion is a distance portion for viewing a far sight, its lower portion is a near portion for viewing a near sight, and the portion between the distance portion and the near portion is a progressive portion where the power changes progressively. On its inner surface situated on the eyeball side, curvatures to form the distance portion, near portion and progressive portion are added (see, for example, PCT Appln. No. WO97/19382, which is incorporated herein by reference).

The inner surface of such an inner-surface progressive addition lens is shaped and formed by cutting and polishing the surface in accordance with the prescriptions (power, cylinder axis and the like) for each individual user. Specifically, a semifinished lens having a curved surface corresponding to the power on the outer convex side of the lens is manufactured, and the inner concave side of the semifinished lens is cut and polished in accordance with prescription data including the cylinder axis, prism angle and the like to finish the inner-surface progressive addition lens.

SUMMARY OF THE INVENTION

The sales routes for the inner-surface progressive addition lenses include a route such that a lens manufacturer manufactures the inner-surface progressive addition lenses and sells them to optical shops, as well as a route such that a lens processor purchases the semifinished lenses from a lens manufacturer, processes the semifinished lenses into the inner-surface progressive addition lenses and sells the inner-surface progressive addition lenses to optical shops.

In the case of the latter route as described above, the lens processor prepares design data of the inner-surface progressive addition lenses and processes the lenses. However, there is a problem that the lens processor cannot process the inner-surface progressive addition lenses as desired, because the preparation of design data of the inner-surface progressive addition lenses is complicated.

It is an object of this invention to provide a method for providing design data and a system for providing design data that enable a lens processor to manufacture a desired inner-surface progressive addition lens according to prescription data.

A method for providing design data is executed on a system comprising a terminal computer device connected to a processing machine purchased by a lens processor and a host computer device connected to this terminal computer device via a communication line and managed by a design data creator, in order to provide design data of an inner-surface progressive addition lens having a distance portion and a near portion with different powers and a progressive portion between the distance and near portions where power changes progressively, wherein curvatures to form the distance portion, the near portion and the progressive portion are added to an inner surface situated on the eyeball side. The method is characterized by comprising: a contract agreement information acquisition process in which the host computer device acquires information that the lens processor agreed on a contract to receive provision of design data of an inner-surface progressive addition lens used for controlling the processing machine on condition that the lens processor pays a consideration to the design data creator; a prescription data acquisition process in which the host computer device acquires prescription data of the inner-surface progressive addition lens from the lens processor via the communication line on condition that the contracts is agreed upon; a design data generation process in the host computer device generates design data corresponding to the prescription data; and a design data distribution process in which the host computer device distributes the generated design data to the terminal computer device.

Here, the design data provided by the design data creator may be an NC processing program for processing the inner-surface progressive addition lens or may be data showing a progressive surface, which is a surface on the eyeball side, as a group of multiple points. In the latter case, the lens processor performs surface interpolation from the group of points and further converts it to an NC processing program.

Since design data prepared by the design data creator on the basis of prescription data is provided to the lens processor that processes the inner-surface progressive addition lens, the lens processor can process the inner-surface progressive addition lens as desired.

Moreover, since the lens processor and the design data creator agreed on a contract to receive provision of design data of the inner-surface progressive addition lens on condition that the lens processor pays a consideration to the design data creator, the design data creator can securely acquire the consideration.

It is preferred that the design data generation process includes a step of selecting predetermined reference design data on the basis of the acquired prescription data from plural reference design data corresponding to addition power of the inner-surface progressive addition lens stored in advance, and a step of processing the selected reference design data on the basis of the prescription data. Since the host computer device on the design data creator side stores the reference design data corresponding to the addition power and processes the reference design data in accordance with the prescription data, data preparation time can be reduced, compared with the case of creating the whole data. Therefore, the design data can be quickly provided to the lens processor.

Moreover, it is preferred that the method comprises: an inspection data generation process for generating inspection data for inspecting optical characteristics of a spectacle lens after processing, from the generated design data; an inspection data distribution process for distributing the generated inspection data to the terminal computer device; an inspection result acquisition process for acquiring an inspection result of the spectacle lens based on the inspection data; a compensation process for compensating the design data on the basis of the acquired inspection result; and a compensated design data distribution process for distributing the compensated design data to the terminal computer device.

Since the inspection data is generated by the host computer device of the design data creator, the inspection data can be provided to the lens processor. This enables the lens processor to easily inspect the manufactured inner-surface progressive addition lens.

Also, since the design data is compensated on the basis of the inspection result, the design data can be made more accurate and the accurate design data can be provided. This enables the lens processor to manufacture the inner-surface progressive addition lens more accurately.

In this case, it is preferred that the method comprises: a number of times of distribution counting process for counting the number of times of distribution of the design data by the design data distribution process; and a billing information generation process for generating billing information to the lens processor on the basis of the counted number of times of distribution.

Since the number of times of distribution of the design data is counted and the billing information to the lens processor is generated on the basis of the counted number of times of distribution, a consideration for the provision of the design data, for example, design fee, license fee or the like can be securely acquired.

This invention can be implemented not only as the method for providing design data but also as a system for providing design data.

That is, a system for providing design data is a design data providing system for providing design data of an inner-surface progressive addition lens having a distance portion and a near portion with different powers and a progressive portion between the distance and near portions where power changes progressively, wherein curvatures to form the distance portion, the near portion and the progressive portion are added to an inner surface situated on eyeball side. The system is characterized by comprising a terminal computer device connected to a processing machine purchased by a lens processor and a host computer device connected to this terminal computer device via a communication line and managed by a design data creator, the host computer device comprising: a contract agreement information acquisition unit for acquiring information that the lens processor agreed on a contract to receive provision of design data of an inner-surface progressive addition lens used for controlling the processing machine on condition that the lens processor pays a consideration to the design data creator; a prescription data acquisition unit for acquiring prescription data of the inner-surface progressive addition lens from the lens processor via the communication line; a reference design data acquisition unit for selecting predetermined reference design data on the basis of the acquired prescription data from plural reference design data corresponding to addition power of the inner-surface progressive addition lens stored in advance; an arranged design unit for processing the selected reference design data on the basis of the prescription data; and a distribution unit for distributing the processed design data to the terminal computer device.

An effect similar to that of the method for providing design data can be achieved.

DETAILED DESCRIPTION OF THE PREFERRED EMBODIMENT

Hereinafter, a preferred embodiment of this invention will be described with reference to the drawings.

Figure 1:
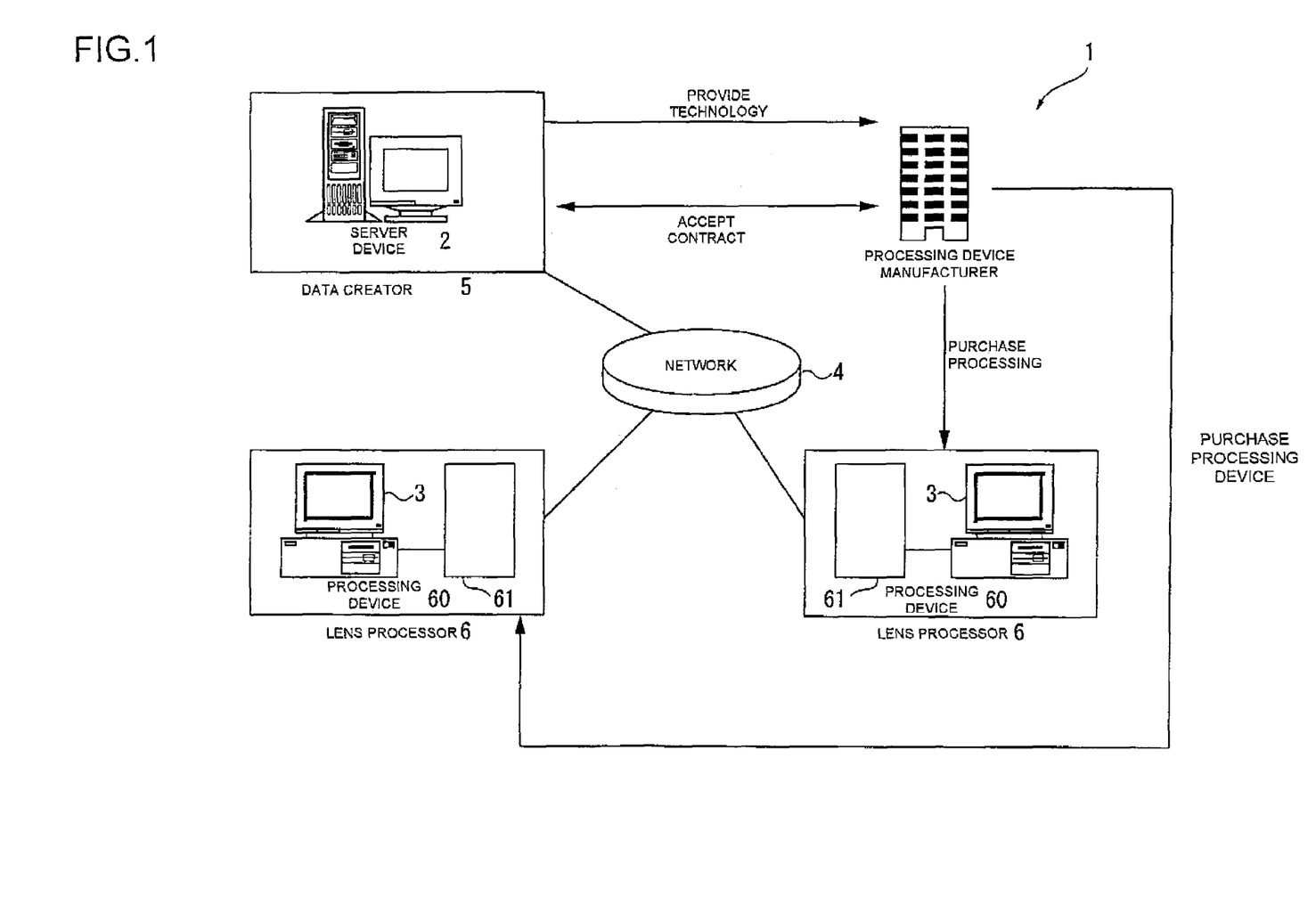
FIG. 1 is a schematic view showing a design data providing system according to an embodiment of this invention.

FIG. 1 shows a design data providing system 1 according to an exemplary embodiment. This design data providing system 1 is a system in which a design data creator 5 provides design data of an inner-surface progressive addition lens L to a lens processor 6 in the case where the lens processor 6 agreed on a contract to receive provision of the design data of the inner-surface progressive addition lens L (see FIG. 2) from the design data creator 5 on condition that the lens processor 6 pays a consideration for it.

Figure 2A:
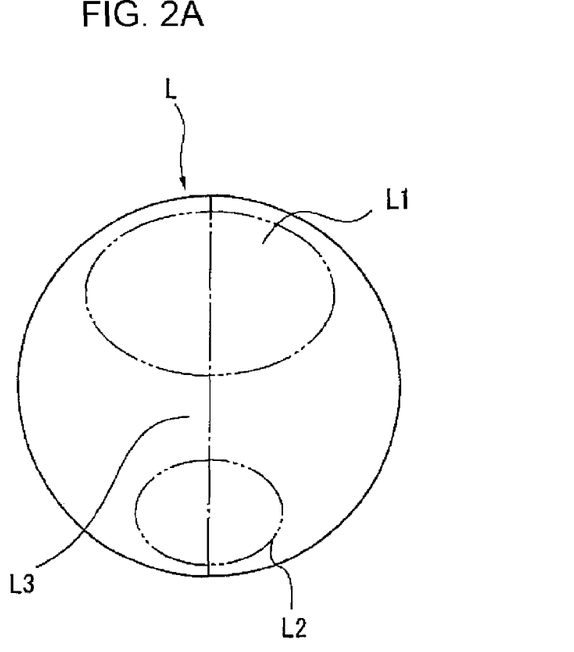
FIG. 2 is a view showing an inner-surface progressive addition lens.
Figure 2B:
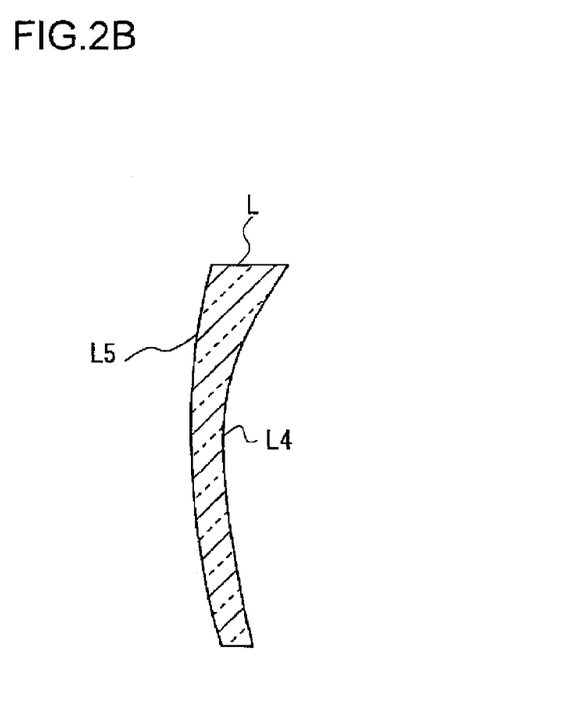

The inner-surface progressive addition lens L is a lens having a distance portion L1 and a near portion L2 with different powers and a progressive portion L3 between these portions where the power changes progressively, in which curvatures to form the distance portion L1, the near portion L2 and the progressive portion L3 are added to an inner surface L4 situated on the eyeball side, as shown in FIG. 2. An outer surface L5 is a spherical surface.

Such an inner-surface progressive addition lens L is obtained by selecting a semifinished lens (substantially circular unfinished lens having a greater thickness than the finished inner-surface progressive addition lens L) corresponding to prescription data and then shaping and forming this semifinished lens on the basis of the design data.

The design data providing system 1 has a server device 2 as a host computer device, a terminal computer device 3, and a network 4 as a communication line connecting the server device 2 to the terminal computer device 3.

Here, the network 4 connects the server device 2 to the terminal computer device 3 so that various data can be transmitted and received between them. As this network 4, any structure that enables transmission and reception of data such as the Internet based on the general-purpose protocol like as TCP/IP (Transmission Control Protocol/Internet Protocol) or intranet like LAN (Local Area Network) can be used.

Figure 3:
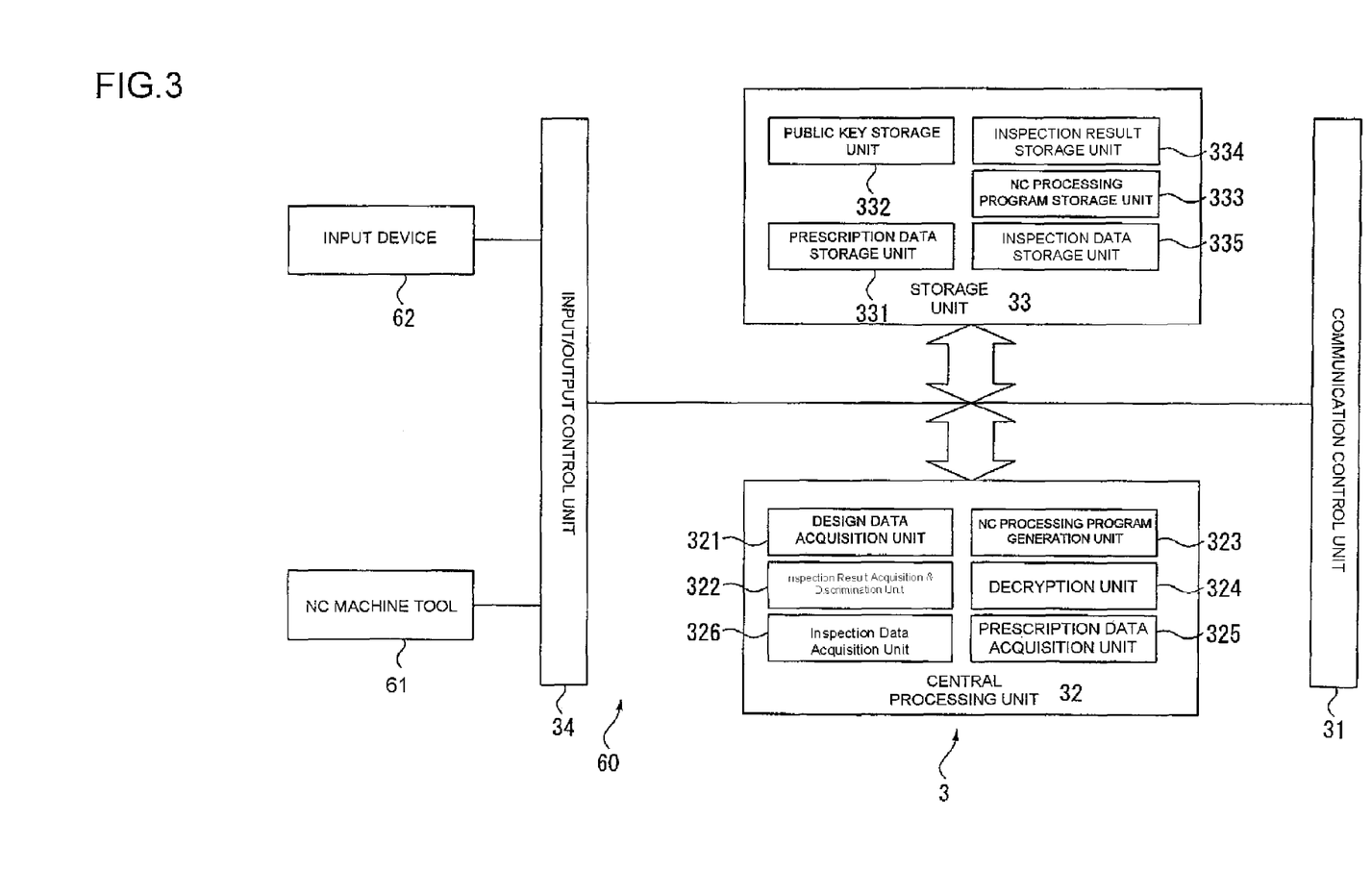
FIG. 3 is a block diagram showing a structure of a terminal computer device.

The terminal computer device 3 is installed in a plant (or so-called laboratory) of the lens processor 6 that processes the inner-surface progressive addition lens L. As shown in FIG. 3, the terminal computer device 3 is connected to an NC machine tool (processing machine) 61 for processing the inner-surface progressive addition lens L, and together with the NC machine tool 61, the terminal computer device 3 constitutes a processing device 60 for processing the inner-surface progressive addition lens L.

The NC machine tool 61 has a numeric value control device for analyzing an NC processing program, calculating the quantity of movement and moving speed of a machine tool body and outputting them to the machine tool body, and the machine tool body having a tool and a driving unit or the like for driving this tool, not shown.

The terminal computer device 3 has a communication control unit 31 for controlling input/output of data or the like from/to the network 4 or the like, a central processing unit 32 constituted by a CPU or the like for executing various programs, a storage unit 33 for storing data, and an input/output control unit 34 connected to the NC machine tool 61 and an input device 62 for inputting data such as a keyboard or mouse.

The central processing unit 32 is a unit for taking out and processing necessary data, of data inputted from the communication control unit 31. It has a design data acquisition unit 321, an inspection result acquisition and discrimination unit 322, an NC processing program generation unit 323, a decryption unit 324, a prescription data acquisition unit 325, and an inspection data acquisition unit 326.

The prescription data acquisition unit 325 is for acquiring prescription data of the inner-surface progressive addition lens L inputted from the input/output control unit 34. The acquired prescription data is stored into a prescription data storage unit 331 of the storage unit 33 and is distributed to the server device 2 via the communication control unit 31.

Here, the prescription data may be, for example, spherical power, cylindrical power, cylinder axis, addition power and the like.

The design data acquisition unit 321 is for acquiring the design data of the inner-surface progressive addition lens L, of the data distributed from the server device 2 via the network 4. Since the design data distributed from the server device 2 has been encrypted, it is decrypted by the decryption unit 324 using a public key distributed in advance. The public key is stored in a public key storage unit 332 of the storage unit 33.

As the design data, thus decrypted, has been constructed as point group data, surface interpolation is performed to generate an NC processing program by the NC processing program generating unit 323. As a technique for surface interpolation, for example, curved surface interpolation using Bezier curve, quadric spline function or the like may be used. The NC processing program prepared in this manner is stored into an NC processing program storage unit 333 of the storage unit 33. Moreover, the NC processing program stored in this NC processing program storage unit 333 is transferred to the NC machine tool 61 via the input/output control unit 34.

The NC processing program is constituted by a series of instruction blocks and contains route information, speed information and the like. The route information is information indicating an instruction to take a predetermined movement locus and has a G code that designates a preparatory function for an operation such as linear interpolation, arcuate interpolation and pause or the like. The speed information has an F code that designates the feed speed.

The inspection data acquisition unit 326 is for acquiring the inspection data, of the data distributed from the server device 2 via the network 4. As this inspection data, which will be later described in detail, a predictive measured value (so-called target value) on the inner-surface progressive addition lens L by a lens meter may be used. With reference to the predictive measured value by the lens meter acquired by the inspection data acquisition unit 326, the processed inner-surface progressive addition lens L is inspected.

The inspection data acquired by the inspection data acquisition unit 326 is stored into an inspection data storage unit 335.

The inspection result acquisition and discrimination unit 322 is for acquiring an actually measured value on the inner-surface progressive addition lens L processed by the NC machine tool 61, then compares the actually measured value with the predictive measured value (so-called target value) and discriminates whether the result is OK or not. This inspection result acquisition and discrimination unit 322 compares the inspection data acquired by the inspection data acquisition unit 326 with the actually measured value by the lens meter, and if the difference between them is equal to or less than a predetermined value, it determines that the inner-surface progressive addition lens L has been manufactured accurately. Inspection items at the lens meter include, for example, spherical power, cylindrical power, cylinder axis, addition power and the like. If it is determined that the difference between the inspection data and the actually measured value exceeds the predetermined value, the inspection result (difference between the actually measured value and the inspection data, and discrimination result indicating a defect) is outputted from the communication control unit 31. This inspection result is then distributed to the server device 2 via the network 4.

The inspection result acquired by this inspection result acquisition and discrimination unit 322 is stored into the inspection result storage unit 334 of the storage unit 33.

Figure 4:
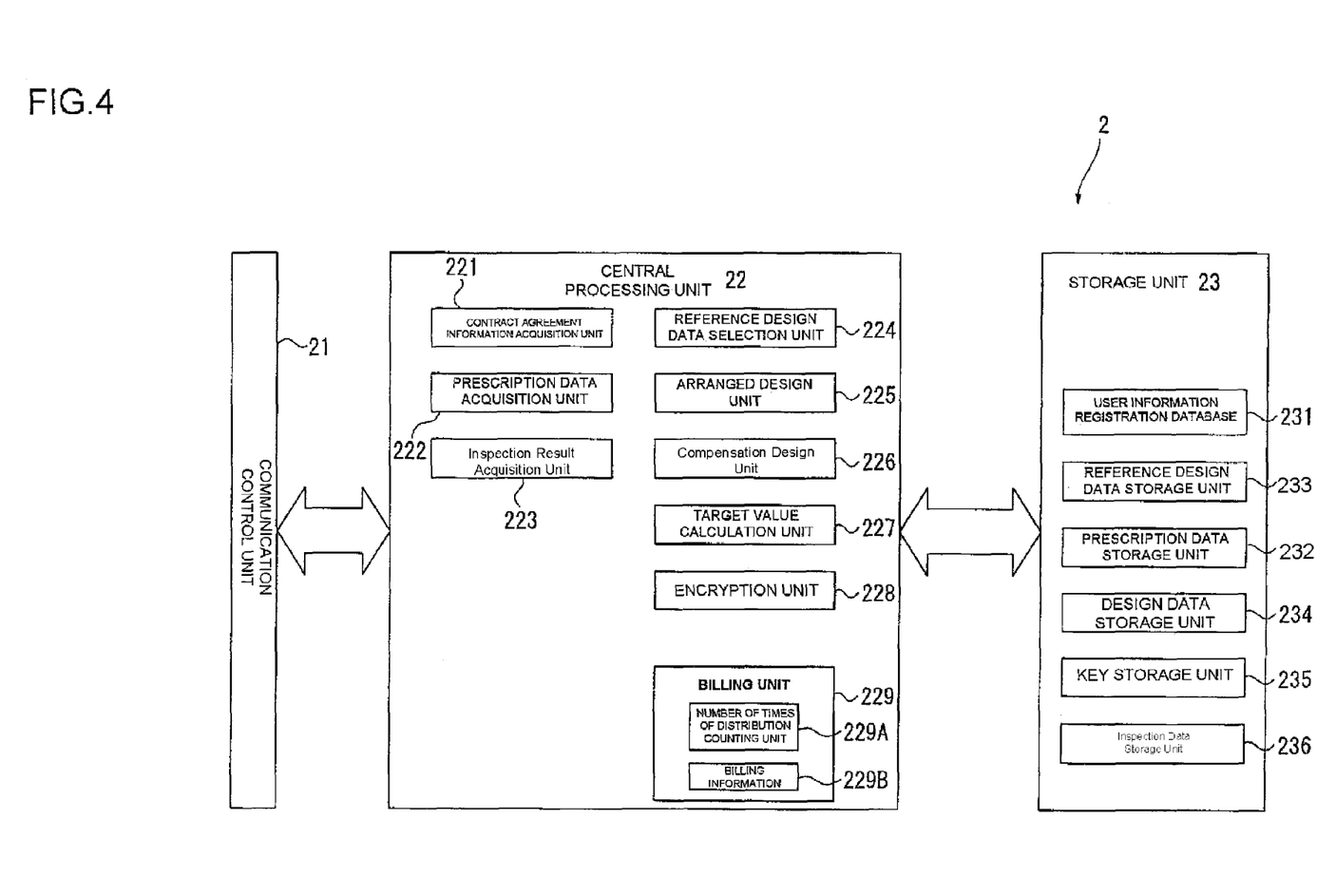
FIG. 4 is a block diagram showing a structure of a server device.

The server device 2 is managed by the design data creator 5, for example, a spectacle lens manufacturer. Here, in this embodiment, the design data creator 5 is a spectacle lens manufacturer and it also manufactures the above-described semifinished lens. Therefore, the design data prepared by the server device 2 of the design data creator 5 is optimal design data for processing the semifinished lens manufactured by the design data creator 5 to manufacture the inner-surface progressive addition lens L.

As shown in FIG. 4, the server device 2 has a communication control unit 21 for controlling input/output of data via the network 4, a central processing unit 22 constituted by a CPU or the like for executing various programs, and a storage unit 23 for storing data.

The communication control unit 21 is a unit for realizing connection with the terminal computer device 3 via the network 4. When the lens processor 6 operates the terminal computer device 3 and thus accesses the server device 2, the communication control unit 21 permits or rejects the access from the terminal computer device 3 and secures communication with the permitted terminal computer device 3. That is, the communication control unit 21 functions as a distribution unit for distributing design data and inspection data.

The central processing unit 22 has a contract agreement information acquisition unit 221, a prescription data acquisition unit 222 for acquiring prescription data of the inner-surface progressive addition lens L from the lens processor 6, an inspection result acquisition unit 223 for acquiring an inspection result from the lens processor 6, a reference design data selection unit 224, an arranged design unit 225, a compensative design unit 226, a target value calculation unit 227, an encryption unit 228, and a billing unit 229.

The contract agreement information acquisition unit 221 is for acquiring contract agreement information in the case where the lens processor 6 agreed on the above-described contract. As the lens processor 6 connects the terminal computer device 3 to the network 4 after purchasing the processing device 60 for processing lenses such as the inner-surface progressive addition lens L, a screen that prompts the lens processor 6 to agree on the above-described contract is displayed on a display unit (not shown) of the terminal computer device 3. If the lens processor 6 agrees on the contract, a screen that prompts the lens processor 6 to carry out user registration is displayed and the lens processor 6 inputs the name, address, telephone number and the like as user information. The user information together with the contract agreement information is acquired by the contract agreement information acquisition unit 221 via the network 4.

The information acquired by the contract agreement information acquisition unit 221 is stored into a user information registration database 231 of the storage unit 23.

Moreover, the contract agreement information acquisition unit 221 generates access ID and password and stores them to the user information registration database 231. The generated access ID and password are sent to the lens processor 6.

When the above-described contract is agreed on, the prescription data acquisition unit 222 acquires prescription data distributed from the lens processor 6. A management number is appended to the acquired prescription data, which is then stored into a prescription data storage unit 232 of the storage unit 23.

Figure 5:
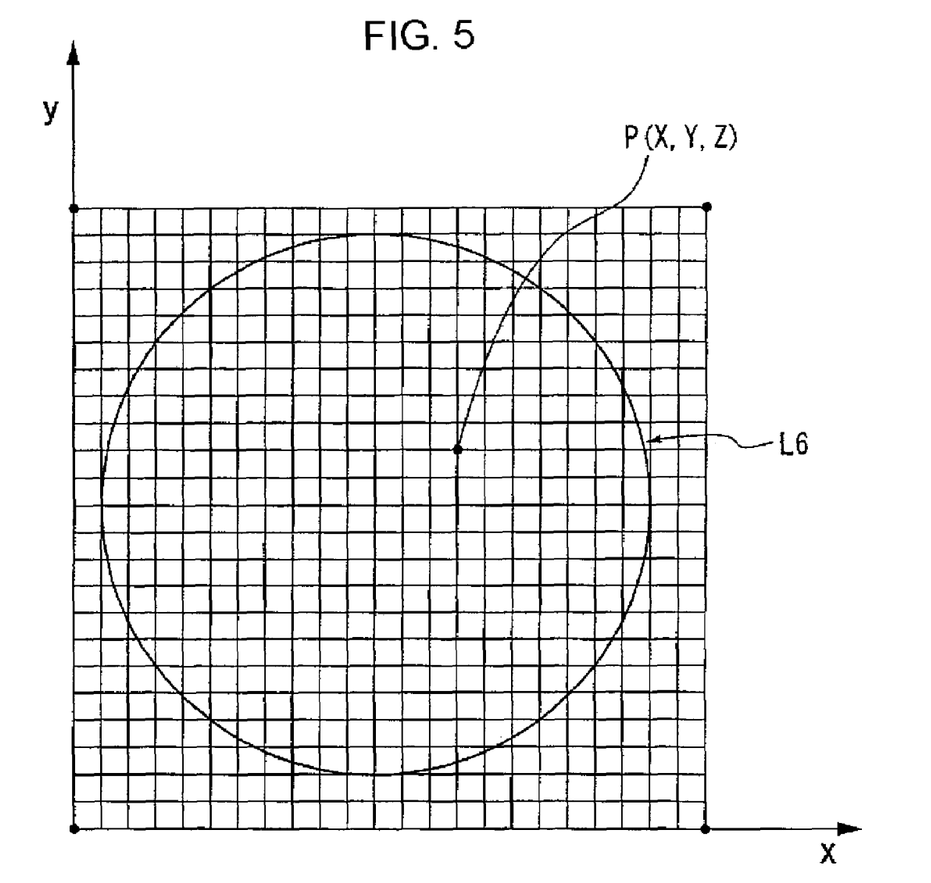
FIG. 5 is a view showing a state where a progressive surface is divided in a form of lattice.

The reference design data selection unit 224 is for selecting reference design data from plural reference design data stored in a reference design data storage unit 233 of the storage unit 23 on the basis of the addition power of the prescription data acquired by the prescription data acquisition unit 222. This reference design data has a group of points constituted by three-dimensional coordinate data of a lattice point P (X, Y, Z) formed by sectioning a reference progressive surface L6 in a form of lattice, as shown in FIG. 5.

The arranged design unit 225 is for changing the reference design data acquired by the reference design data selection unit 224 on the basis of the prescription data.

For example, the arranged design unit 225 changes the curvature of the progressive surface (surface on the eyeball side) on the basis of spherical power, which is one of the prescription data. In accordance with this, the value of Z of an arbitrary point (X, Y, Z) on the eyeball-side surface of the inner-surface progressive addition lens L is calculated.

That is, the value of Z is expressed by the following equation (1).

If an axis extending from the object side to the eyeball side and passing through the center of the progressive surface (surface on the eyeball side) is Z-axis, an axis extending from the lower side to the upper side and orthogonal to the Z-axis is Y-axis, and an axis extending from left to right and orthogonal to the Z-axis is X-axis, X and Y of an arbitrary point (X, Y, Z) represent arbitrary X- and Y-coordinates of the surface on the eyeball side, respectively, and Z represents the Z-coordinate of the surface on the eyeball side.

$$Z=\{(Cp+Cx)X^2+(Cp+Cy)X^2+(Cp+Cy)Y^2\}/\{1+\sqrt{(1-(Cp+Cx)^2X^2-(Cp+Cy)^2Y^2)}\} \quad (1)$$

The surface on the eyeball side is acquired by combining an original progressive-power surface for the surface on the eyeball side to exhibit only a desired progressive sight correction property and an original toric surface for the surface on the eyeball side to exhibit only an astigmatism correction property.

Cp represents approximate curvature as average curvature in the radial direction of the original progressive surface. Cx represents curvature in the direction of the X-axis of the original toric surface. Cy represents curvature in the direction of the Y-axis of the original toric surface.

Cx is expressed by the following equation (2).

$$Cx=(Csf-S-Cb)/(n-1) \quad (2)$$

Cb represents curvature (base curve) of the surface on the object side of the reference design data, that is, the surface on the outer side. Csf represents curvature (base curve) of the surface on the outer side of the semifinished lens n represents refractive index of the semifinished lens. S represents spherical power of the prescription data.

Cy is expressed by the following equation (3).

$$Cy=(Cx+Ct)/(n-1) \quad (3)$$

Ct represents curve by astigmatism.

The design data thus designed is stored into a design data storage unit 234 of the storage unit 23.

In the case where it is known that the design data designed by the arranged design unit 225 must be compensated in advance, the data designed by the arranged design unit 225 may be compensated by the compensative design unit 226, which will be described later, and then stored into the design data storage unit 234 of the storage unit 23.

The target value calculation unit 227 is an inspection data generation unit for generating inspection data for inspecting optical characteristics of the inner-surface progressive addition lens L. This target value calculation unit 227 is for performing surface interpolation of the design data constituted by a group of point designed by the arranged design unit 225 and then predicting and calculating an actually measured value of the inner-surface progressive addition lens L by the lens meter using a ray tracing method. Since the progressive surface, which is the surface on the eyeball side, of the inner-surface progressive addition lens L is formed by an aspherical surface, when a user actually wears the spectacles, the visual line is not orthogonal to the surfaces on the eyeball side of the spectacle lenses. However, in the measurement by the lens meter, the optical axis is made orthogonal to the surface on the eyeball side. Accordingly, the value of the prescription data differs from the measured value. Therefore, the actually measured value of the inner-surface progressive addition lens by the lens meter is predicted and calculated in advance and this predicted value (target value) is used as inspection data.

For example, if the inner-surface progressive addition lens L has prescriptions of spherical power S of +4D, cylindrical power C of −2D and cylinder axis of 10 degrees in the near portion L2, the target values are, for example, spherical power S of +4.1D, cylindrical power C of −1.7D and cylinder axis of 10 degrees.

Since the calculated values (target values) calculated by this target value calculation unit 227 are used for inspecting the inner-surface progressive addition lens L, these values are distributed as inspection data to the terminal computer device 3 of the lens processor 6 via the network 4.

The inspection result acquisition unit 223 is for acquiring the inspection result of the inner-surface progressive addition lens L distributed from the lens processor 6 via the network 4. In the case where the inspection result is acquired by this inspection result acquisition unit 223, the compensative design unit 226 reads out the design data stored in the design data storage unit 234 and performs compensation processing of the design data on the basis of the inspection result.

The compensative design unit 226 compares, for example, the power of the distance portion L1 of the inner-surface progressive addition lens L or the powers of the distance portion L1 and the near portion L2 of the actually measured values included in the inspection result with the target values, calculates the difference from the target values again to confirm the difference between the actually measured values and the target values, and compensates the design data.

For example, it is assumed that the quantity of compensation of the curvature of the distance portion L1 in the direction of the X-axis is Cdx, the quantity of compensation of its curvature in the direction of the Y-axis is Cdy, the quantity of compensation of the curvature of the near portion L2 in the direction of the X-axis is Cnx, the quantity of compensation of its curvature in the direction of the Y-axis is Cny, the center coordinate of the distance portion L1 is (Xd, Yd), and the center coordinate of the near portion L2 is (Xn, Yn).

In this case, the quantities of compensation Cpx and Cpy in the progressive portion L3 are expressed by the following equations (4) and (5).

$$Cpx = ((Cnx-Cdx)/(Yn-Yd)) \times (Y-Yd) + Cdx \quad (4)$$

$$Cpy = ((Cny-Cdy)/(Yn-Yd)) \times (Y-Yd) + Cdy \quad (5)$$

In these equations, Y represents the value of the Y-coordinate of the position for which the quantity of compensation is calculated.

As these quantities of compensation (Cdx, Cdy, Cnx, Cny, Cpx, Cpy) are substituted into Cx and Cy of the equation (1), the quantity of compensation of the Z-coordinate is calculated.

The encryption unit 228 is for encrypting, with a private key, the design data designed by the arranged design unit 225 or the design data compensatively designed by the compensative design unit 226, when distributing these design data to the network 4 via the communication control unit 21. The design data encrypted with the private key is provided with an identification number or the like and therefore it can be decrypted only by a public key corresponding to the identification number appended to the design data.

The encrypted design data is distributed to the terminal computer device 3 of the lens processor 6 via the network 4.

The encryption technique is not limited to the above-described technique and other known techniques can be used.

The billing unit 229 has a number of times of distribution counting unit 229A for counting the number of times of distribution of the design data from the communication control unit 21, and a billing information generation unit 229B for generating billing information to the lens processor on the basis of the counted number of times of distribution.

The billing information generation unit 229B calculates a consideration every month or every half year on the basis of the number of times of distribution from the number of times of distribution counting unit 229A and thus generates billing information. Then, the billing information generation unit 229B issues a bill, for example, on the basis of the data stored in the user information registration database 231 of the storage unit 23, or performs settlement processing, for example, by using firm banking (FB) constructed on a so-called financial VAN (value added network), which is a value added communication network managed by each financial institution via the network 4, or distributes information to the effect that settlement processing is to be performed to the terminal computer device 3 via the network 4 and thus notifies the lens processor 6 of the information to prompt the lens processor 6 to perform settlement processing.

Here, in the case where the design data creator 5 owns a patent on the inner-surface progressive addition lens L, the license fee may be an example of the consideration.

Moreover, the billing unit 229 may calculate not only the consideration based on the number of times of provision of the design data from the communication control unit 21 but also the design fee of the inner-surface progressive addition lens L as a consideration.

The number of times of distribution counting unit 229A of the billing unit 229 is adapted for subtracting the number of times of distribution of the design data from the communication control unit 21 compensated by the compensative design unit 226 after the inspection result acquisition unit 223 acquires the inspection result, from the total number of times of distribution of the design data.

The storage unit 23 has the user information registration database 231 for registering user data acquired by the contract agreement information acquisition unit 221, the prescription data storage unit 232 for storing prescription data acquired by the prescription data acquisition unit 222, the reference design data storage unit 233, the design data storage unit 234, a key storage unit 235, and an inspection data storage unit 236.

The user information registration database 231 is a unit for storing information of the lens processor 6 that agreed on a contract. It has a design data provision status table and a user master table.

The design data provision status table stores the number of times of distribution of design data, the number of times of compensation of design data and the like for each lens processor 6.

The user master table is a table for managing user information. In this table, information such as user code, name, address, telephone number, access ID and a password of the lens processor 6 is registered in association with the lens processor.

The prescription data storage unit 232 stores the prescription data distributed from each lens processor 6, in association with each lens processor 6. Each prescription data is provided with a management number.

The reference design data storage unit 233 stores plural reference design data of the inner-surface progressive addition lens L corresponding to plural different addition powers. For example, it stores reference design data corresponding to addition power increasing by 0.25D each within a range of 0.50D to 3.50D.

Such reference design data are constituted on the basis of design parameters such as addition power, length of progressive zone, change in power in progressive zone, and width of progressive zone.

The design data storage unit 234 is for storing the design data designed by arranged design unit 225 and the design data compensated by the compensative design unit 226. The design data is stored in association with each lens processor 6 providing the design data and the management number appended to the prescription data.

The key storage unit 235 is for storing a private key corresponding to the public key distributed to the lens processor 6. The private key is stored in association with each lens processor 6.

The inspection data storage unit 236 is for storing the target value calculated by the target value calculation unit 227. The target value is stored in association with each lens processor 6 and the management number appended to the prescription data.

Next, a method for providing design data using the design data providing system 1 as described above will be described with reference to FIGS. 1 to 6.

First, the design data creator 5 presents to a processing device manufacturer 7 a contract to the effect that the above-described contract (to the effect that the lens processor 6 that purchases the processing device 60 receives provision of design data of the inner-surface progressive addition lens L from the design data creator 5 on condition that the lens processor 6 pays a consideration to the design data creator 5) is appended to the processing device 60 to be sold on condition that the design data creator 5 provides a technique for manufacturing the inner-surface progressive addition lens L.

The processing device manufacturer 7 mentioned here is a manufacturer/dealer that manufactures and sells the processing device 60 for processing lenses such as the inner-surface progressive addition lens L.

In the case where the processing device manufacturer 7 agreed on the contract presented by the design data creator 5, the technique for manufacturing the inner-surface progressive addition lens L is provided by the design data creator 5. As the processing device manufacturer 7 receives the provision of the technique for manufacturing the inner-surface progressive addition lens L, the processing device manufacturer 7 can manufacture and sell the processing device 60 that can manufacture the inner-surface progressive addition lens L of quality desired by the design data creator 5.

Next, the lens processor 6 purchases the processing device 60 with the above-described contract appended thereto, from the processing device manufacturer 7.

As the lens processor 6 that purchased the processing device 60 connects the terminal computer device 3 of the processing device 60 to the network 4, a screen that prompts the lens processor 6 to agree on the above-described contract (to the effect that the lens processor 6 receives provision of design data of the inner-surface progressive addition lens L from the design data creator 5 on condition that the lens processor 6 pays a consideration to the design data creator 5) is displayed on the display unit (not shown) of the terminal computer device 3. If the lens processor 6 agrees on the contract, a screen that prompts the lens processor 6 to perform user registration is displayed and the lens processor 6 inputs its name, address, telephone number and the like. These items of information are distributed from the terminal computer device 3 (processing S1 of FIG. 6) and acquired by the contract agreement information acquisition unit 221 of the server device 2 via the network 4 (contract agreement information acquisition process, processing S2). The information acquired by the contract agreement information acquisition unit 221 is stored into the user information registration database 231 of the storage unit 23.

Figure 6:
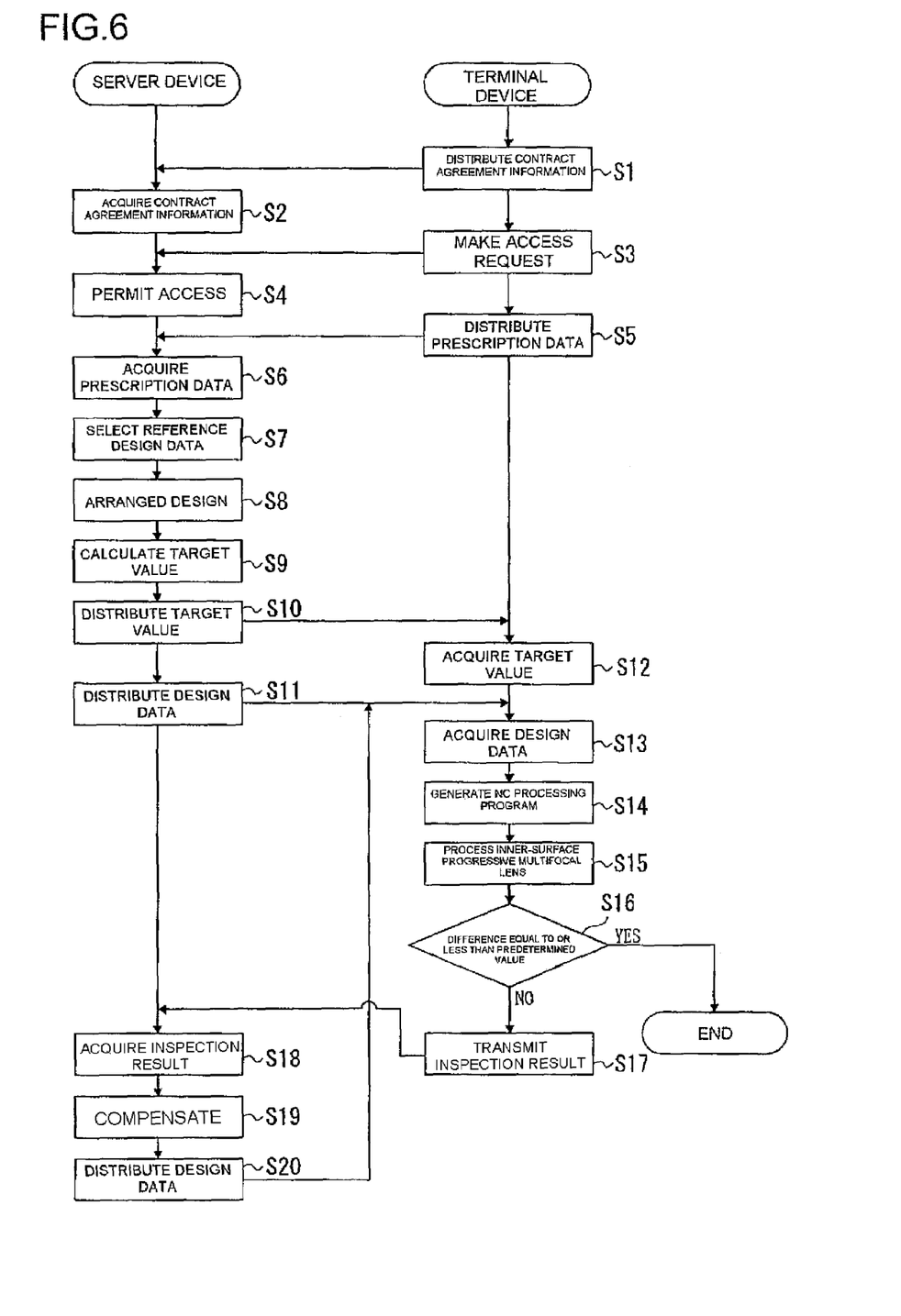
FIG. 6 is a flowchart showing each process of a method for providing design data according to an embodiment of this invention.

If the lens processor 6 does not agree on the above-described contract, the lens processor 6 cannot receive provision of the design data from the design data creator 5, but not agreeing to the contract does not hinder the driving of the processing device 60.

Next, as the lens processor 6 operates the terminal computer device 3 to make an access request to the server device 2 (processing S3), the communication control unit 21 of the server device 2 prompts the lens processor 6 to input access ID, password and the like. When the access ID and password are transmitted from the terminal computer device 3, the communication control unit 21 of the server device 2 permits or rejects access. For example, the transmitted access ID and password are collated with the access ID, password and the like stored in the user information registration database 231, and if these access IDs, passwords and the like coincide, access is permitted (use permission process, processing S4).

As the lens processor 6 inputs prescription data to the terminal computer device 3, the prescription data is acquired by the prescription data acquisition unit 325 of the terminal computer device 3 and distributed to the server device 2 via the communication control unit 31 (processing S5).

In the server device 2, the prescription data acquisition unit 222 acquires the prescription data (prescription data acquisition process, processing S6). This prescription data is stored into the prescription data storage unit 232 of the storage unit 23 of the server device 2. Next, in the server device 2, design data corresponding to the prescription data is generated (design data generation process). More specifically, first, the reference design data selection unit 224 selects reference design data from the reference design data storage unit 233 of the storage unit 23 on the basis of the addition power of the prescription data (processing S7).

Also, in the server device 2, a semifinished lens to be used is selected on the basis of the prescription data.

Moreover, the arranged design unit 225 of the server device 2 processes the reference design data acquired by the reference design data selection unit 224 on the basis of the prescription data and the selected semifinished lens (processing S8). The design data thus acquired is stored into the design data storage unit 234 of the storage unit 23.

Also, in the server device 2, the target value calculation unit 227 calculates a target value as inspection data on the basis of the prescription data acquired by the prescription data acquisition unit 222 (inspection data generation process, processing S9). The target value is stored into the inspection data storage unit 236.

The design data and target value calculated as described are distributed from the communication control unit 21 (design data distribution process, processing S10, and inspection data distribution process, processing S11). The design data is encrypted by the encryption unit 228 and then distributed.

In the terminal computer device 3, the inspection data acquisition unit 326 acquires the target value (processing S12) and the design data acquisition unit 321 acquires the design data (processing S13).

The design data acquired by the design data acquisition unit 321 is decrypted by the decryption unit 324 and generated as an NC processing program by the NC processing program generation unit 323 (processing S14). This NC processing program is transferred to the NC machine tool 61.

The lens processor 6 uses the semifinished lens selected in the server device 2 and processes the semifinished lens by cutting or polishing using the NC machine tool 61 (processing S15). Thus, the inner-surface progressive addition lens L can be acquired.

Next, the acquired inner-surface progressive addition lens L is inspected (inspection process, processing S16).

The lens processor 6 measures the manufactured inner-surface progressive addition lens L by using a lens meter and inputs an actually measured value to the terminal computer device 3. Then, the inspection result acquisition and discrimination unit 322 acquires the actually measured value. The target value, which is the inspection data stored in the inspection data storage unit 335, is read out, and the target value and the actually measured value are compared with each other. If the difference between the target value and the actually measured value is equal to or less than a predetermined value, it is determined that the inner-surface progressive addition lens L having desired optical characteristics is manufactured.

On the other hand, if the difference between the target value and the actually measured value exceeds the predetermined value, it is determined that the inner-surface progressive addition lens L having desired optical characteristics is not to be manufactured, and the inspection result (the actually measured value and the difference between the actually measured value and the target value) is transmitted from the communication control unit 31 (processing S17).

The inspection result acquisition unit 223 of the server device 2 acquires the inspection result (inspection result acquisition process, processing S18). Then, the compensative design unit 226 reads out the design data stored in the design data storage unit 234 and performs compensation processing on the design data on the basis of the inspection result acquired by the inspection result acquisition unit 223 (compensation process, processing S19).

The server device 2 transmits the design data compensated by the compensative design unit 226 to the terminal computer device 3 again via the communication control unit 21 (compensated design data distribution process, processing S20). In the terminal computer device 3, the operations of processing S13 to S15 are performed again and the inspection result acquisition and discrimination unit 322 performs discrimination again (processing S16). The processing S13 to S20 is repeated until the difference between the target value acquired by the inspection data acquisition unit 326 and the actually measured value becomes equal to or less than the predetermined value.

In the design data providing system 1 as described above, the billing unit 229 of the server device 2 calculates a consideration every month or every half year on the basis of the number of times of provision of the design data from the communication control unit 21 and thus generates billing information. When counting the number of times of distribution of the design data, the number of times of distribution of the design data from the communication control unit 21 compensated by the compensative design unit 226 after the inspection result acquisition unit 223 acquires the inspection result is subtracted from the total number of times of distribution of the design data. Then, a bill is issued to the lens processor 6, for example, on the basis of the data stored in the user information registration database 231 of the storage unit 23.

Thus, according to this embodiment, the following effects can be achieved.

(1) According to the design data providing system 1 in this embodiment, since the design data prepared by the design data creator 5 on the basis of the prescription data is provided to the lens processor 6 that processes the inner-surface progressive addition lens L, the lens processor 6 can process the inner-surface progressive addition lens L as desired.

(2) Moreover, since the lens processor 6 and the design data creator 5 agreed on the contract to the effect that the lens processor 6 receives provision of the design data of the inner-surface progressive addition lens L on condition that the lens processor 6 pays a consideration to the design data creator 5, the design data creator 5 can securely acquire the consideration.

(3) Since the reference design data corresponding to the addition power is stored in the server device 2 on the side of the design data creator 5 and this reference design data is processed in accordance with the prescription data, the data preparation time can be reduced, compared with the case of creating the whole data. Therefore, the design data can be quickly provided to the lens processor 6.

(4) Since the server device 2 on the side of the design data creator 5 has the compensative design unit 226, if the terminal computer device 3 on the side of the lens processor 6 has determined that the difference between the inspection data and the actually measured value on the inner-surface progressive addition lens L exceeds a predetermined value, the design data can be compensated and then distributed to the terminal computer device 3 again. Thus, more accurate design data can be provided.

(5) The server device 2 on the side of the design data creator 5 has the target value calculation unit 227, and it predicts and calculates an actually measured value on the inner-surface progressive addition lens L by the lens meter by using a ray tracing method and distributes the value to the terminal computer device 3. Therefore, the lens processor 6 can inspect the manufactured inner-surface progressive addition lens L easily and accurately.

(6) Also, since the server device 2 carries out billing in accordance with the number of times of distribution of the design data, a consideration for the provision of the design data can be securely collected. Particularly in the case where the design data creator 5 owns a patent or the like on the inner-surface progressive addition lens L, the design data creator can collect a license fee as a consideration.

(7) Moreover, when generating billing information, the billing unit 229 of the server device 2 on the side of the design data creator 5 subtracts the number of times of distribution of the design data from the data communication unit 21 compensated by the compensative design unit 226, from the total number of times of provision of the design data. By doing so, the server device 2 can accurately collect a consideration without billing for a case where design data with deviated values is prepared and provided, and so on.

(8) Moreover, in the design data providing system 1 in this embodiment, the design data creator 5 makes a contract with the processing device manufacturer 7 to the effect that a predetermined contract (to the effect that the lens processor 6 that purchases the processing device 60 receives provision of the design data of the inner-surface progressive addition lens L from the design data creator 5 on condition that the lens processor 6 pays a consideration to the design data creator 5) is appended to the processing device 60 to be sold on condition that the design data creator 5 provides a technique for manufacturing the inner-surface progressive addition lens L.

By doing so, the processing device manufacturer 7 can receive the provision of the technique for manufacturing the inner-surface progressive addition lens L and thus can manufacture and sell the processing device that can manufacture the inner-surface progressive addition lens L of a quality desired by the design data creator 5.

(9) Moreover, in this embodiment, the design data creator 5 is a manufacturer of spectacle lenses and it also manufactures the above-described semifinished lens. The design data prepared by the server device 2 on the side of the design data creator 5 is optimal design data for processing the semifinished lens manufactured by the design data creator 5 to manufacture the inner-surface progressive addition lens L. Therefore, as the design data creator 5 provides the design data, the number of sold semifinished lenses manufactured by the design data creator 5 can be increased.

(10) Also, in this embodiment, the lens processor 6 that purchased the processing device 60 with the predetermined contract appended thereto connects the terminal computer device 3 to the network 4 and thus agrees on the above-described contract. Therefore, as the above-described contract is appended to the processing device 60 and the contract can be agreed on through the network 4, the design data creator 5 can securely make a contract even if the address or the like of a destination of sales of the processing device 60 is not known.

This invention is not limited to the above-described embodiment and includes modifications, improvements and the like as long as the object of this invention can be achieved.

For example, while the target value is calculated as inspection data in the server device 2 in the above-described embodiment, inspection data is not limited to this and, for example, an aberration graph of the inner-surface progressive addition lens L may be generated as inspection data and distributed to the terminal computer device 3 via the network 4. As this is done, the shape of the progressive surface and the aberration curve of the aberration graph of the inner-surface progressive addition lens L acquired on the side of the lens processor 6 are compared with each other to perform inspecting.

The server device 2 may be constructed without having the inspection data generation unit for generating inspection data.

Moreover, while the server device 2 in the above-described embodiment has the billing unit 229 for billing in accordance with the number of times of provision of the design data, the server device may be constructed without having the billing unit 229. For example, the lens processor 6 may make an application for processing of a certain number of inner-surface progressive addition lenses L to the design data creator 5, and the design data creator 5 may demand a consideration corresponding to this number.

Also, while data constituted by a group of points is distributed as design data distributed from the server device 2 in the above-described embodiment, data obtained by performing surface interpolation on the group of points may be distributed from the server device 2. In this case, if the deviation at each point of the group of points (for example, difference in the value of Z) is large, data obtained by compensating (that is, smoothing) the deviation and thus performing surface interpolation may be distributed. As the data obtained by compensating the deviation is distributed in this manner, the lens processor 6 need not perform compensation or the like of the point group data and more optimal data can be provided.

Also, as the surface-interpolated data is provided, the terminal computer device 3 need not perform surface interpolation and therefore the work at the terminal computer device 3 can be simplified.

Moreover, though data constituted by a group of points is distributed as design data distributed from the server device 2, an NC processing program may be generated from the design data and the NC processing program may be distributed from the server device 2. Thus, the terminal computer device 3 need not convert the NC processing program and therefore the time and labor for processing the inner-surface progressive addition lens L can be reduced.

In the above-described embodiment, as the lens processor 6 connects the terminal computer device 3 of the processing device 60 to the network 4, a screen that prompts the lens processor 6 to agree on the above-described contract is displayed on the display unit (not shown) of the terminal computer device 3, and when the contract is agreed on, contract agreement information is distributed to the server device 2 via the network 4. However, this invention is not limited to such a structure and, for example, a written contract may be appended to the processing device 60 so that the lens processor 6 may agree on and sign this written contract and send it to the design data creator 5 by mail. The design data creator 5 may confirm the sign on the written contract and then input the contract agreement information to the server device 2.

Moreover, while the terminal computer device 3 in the above-described embodiment has the inspection result acquisition and discrimination unit 322 to discriminate whether the difference between the target value and the actually measured value is equal to or less than a predetermined value or not, this invention is not limited to this and, for example, an inspection result acquisition and discrimination unit may be provided in the server device 2 and the actually measured value may be distributed to the server device 2 from the terminal computer device 3 via the network 4 so that the server device 2 can discriminate whether the difference between the actually measured value and the target value is equal to or less than the predetermined value or not.

Also, while the reference design data is stored in the reference design data storage unit 233 of the server device 2 in the above-described embodiment, this invention is not limited to this and the reference design data may be stored, for example, in the terminal computer device 3. In this case, as the server device acquires prescription data, the server device selects the reference design data to be used and processes the selected reference design data to generate design data. Then, the server device distributes the design data to the terminal computer device.

As the reference design data is thus stored in the terminal computer device 3, the burden on the server device 2 can be reduced.

In this case, the server device 2 may generate new reference design data to enable update of the reference design data in the terminal computer device.

What is claimed is:

1. A method for providing design data in a system comprising a terminal computer device, a processing machine connected to the terminal computer device and operated by a lens processor, and a host computer device connected to the terminal computer device via a communication line and managed by a design data creator, the design data including information of an inner-surface progressive addition lens having a distance portion and a near portion with different respective powers, and a progressive portion disposed between the distance and near portions where power changes progressively, the method comprising:

a contract agreement information acquisition process in which the host computer device acquires information indicating that the lens processor has agreed to pay consideration to the design data creator in order to receive design data of an inner-surface progressive addition lens used for controlling the processing machine;

a prescription data acquisition process performed after the contract agreement information acquisition process in which the host computer device acquires prescription data of the inner-surface progressive addition lens from the lens processor via the communication line;

a design data generation process in the host computer device for generating design data corresponding to the acquired prescription data; and a design data distribution process in which the host computer device distributes the generated design data to the terminal computer device.

2. The method for providing design data as claimed in claim 1, wherein the design data generation process includes:
  selecting predetermined reference design data on the basis of the acquired prescription data from plural reference design data; and
  processing the selected reference design data on the basis of the prescription data.

3. The method for providing design data as claimed in claim 1, further comprising:
  an inspection data generation process for generating inspection data for inspecting optical characteristics of a spectacle lens; and
  an inspection data distribution process for distributing the generated inspection data to the terminal computer device.

4. The method of providing design data as claimed in claim 3, further comprising:
  an inspection result acquisition process for acquiring an inspection result of the spectacle lens based on the inspection data; and
  a compensation process for compensating the design data on the basis of the acquired inspection result.

5. The method for providing design data as claimed in claim 1, further comprising:
  a number of times of distribution counting process for counting the number of times of distribution of the design data by the design data distribution process; and
  a billing information generation process for generating billing information to the lens processor on the basis of the counted number of times of distribution.

6. The method for providing design data as claimed in claim 4, wherein the compensation process is conducted in the host computer device.

7. The method of providing design data s claimed in claim 6, further comprising a compensated design distribution process for distributing the compensated design data to the terminal computer device.

8. A system for providing design data of an inner-surface progressive addition lens having a distance portion and a near portion with different respective powers and a progressive portion disposed between the distance and near portions where power changes progressively,
  the system comprising a terminal computer device, a processing machine connected to the terminal computer device and operated by a lens processor, and a host computer device connected to the terminal computer device via a communication line and managed by a design data creator,
  the host computer device comprising:
    a contract agreement information acquisition unit for acquiring information indicating that the lens processor has agreed to pay consideration to the design data creator to receive design data of an inner-surface progressive addition lens used for controlling the processing machine;
    a prescription data acquisition unit for acquiring prescription data of the inner-surface progressive addition lens from the lens processor via the communication line;
    a reference design data acquisition unit for selecting predetermined reference design data on the basis of the acquired prescription data from plural reference design data;
    an arranged design unit for processing the selected reference design data on the basis of the prescription data; and
    a distribution unit for distributing the processed design data to the terminal computer device.

9. The system for providing design data as claimed in claim 8, further comprising:
  an inspection data generation unit for generating inspection data for inspecting optical characteristics of a spectacle lens; and
  an inspection data distribution unit for distributing the generated inspection data to the terminal computer device.

10. The system of providing design data as claimed in claim 9, further comprising:
  an inspection result acquisition unit for acquiring an inspection result of the spectacle lens based on the inspection data; and
  a compensation unit for compensating the design data on the basis of the acquired inspection result.

11. The system for providing design data as claimed in claim 8, further comprising:
  a number of times of distribution counting unit for counting the number of times of distribution of the design data by the distribution unit; and
  a billing information generation unit for generating billing information to the lens processor on the basis of the counted number of times of distribution.

12. The system for providing design data as claimed in claim 10, wherein the compensation unit is located in the host computer device.

13. The system of providing design data s claimed in claim 12, further comprising a compensated design distribution unit for distributing the compensated design data to the terminal computer device.

14. A system for providing design data in a system comprising a terminal computer device, a processing machine connected to the terminal computer device and operated by a lens processor, and a host computer device connected to the terminal computer device via a communication line and managed by a design data creator, the design data including information of an inner-surface progressive addition lens having a distance portion and a near portion with different respective powers, and a progressive portion disposed between the distance and near portions where power changes progressively, the system comprising:
  a contract agreement information acquisition unit in which the host computer device acquires information indicating that the lens processor has agreed to pay consideration to the design data creator in order to receive design data of an inner-surface progressive addition lens used for controlling the processing machine;
  a prescription data acquisition unit operable after the contract agreement information acquisition unit acquires the consideration information for allowing the host computer device to acquire prescription data of the inner-surface progressive addition lens from the lens processor via the communication line;
  a design data generation unit in the host computer device for generating design data corresponding to the acquired prescription data; and
  a design data distribution unit operable for allowing the host computer device to distribute the generated design data to the terminal computer device.

15. The system for providing design data as claimed in claim 14, wherein the design data generation unit is operable for selecting predetermined reference design data on the basis of the acquired prescription data from plural reference design data; and processing the selected reference design data on the basis of the prescription data.

16. The system for providing design data as claimed in claim 14, further comprising:

an inspection data generation unit for generating inspection data for inspecting optical characteristics of a spectacle lens; and an inspection data distribution unit for distributing the generated inspection data to the terminal computer device.

17. The system of providing design data as claimed in claim 16, further comprising:

an inspection result acquisition unit for acquiring an inspection result of the spectacle lens based on the inspection data; and a compensation unit for compensating the design data on the basis of the acquired inspection result.

18. The system for providing design data as claimed in claim 14, further comprising:

a number of times of distribution counting unit for counting the number of times of distribution of the design data by the design data distribution unit; and a billing information generation unit for generating billing information to the lens processor on the basis of the counted number of times of distribution.

19. The system for providing design data as claimed in claim 17, wherein the compensation unit is located in the host computer device.

20. The system of providing design data as claimed in claim 19, further comprising a compensated design distribution unit for distributing the compensated design data to the terminal computer device.

* * * * *